US006937653B2

(12) United States Patent
Song et al.

(10) Patent No.: US 6,937,653 B2
(45) Date of Patent: Aug. 30, 2005

(54) RATE CONTROL APPARATUS AND METHOD FOR REAL-TIME VIDEO COMMUNICATION

(75) Inventors: Joon-Ho Song, Ichon-shi (KR); Hyun-Soo Kang, Ichon-shi (KR); Jae-Won Chung, Ichon-shi (KR)

(73) Assignee: Hyundai Electronics Industries, Co., Ltd., KyoungKi-do (KR)

( * ) Notice: Subject to any disclaimer, the term of this patent is extended or adjusted under 35 U.S.C. 154(b) by 719 days.

(21) Appl. No.: 09/861,359

(22) Filed: May 18, 2001

(65) Prior Publication Data

US 2002/0012395 A1 Jan. 31, 2002

(30) Foreign Application Priority Data

Jun. 28, 2000 (KR) ........................................ 2000-35982

(51) Int. Cl.[7] .................................................. H04N 7/18
(52) U.S. Cl. .............................. 375/240.03; 375/240.06
(58) Field of Search ........................ 375/240.01–240.29

(56) References Cited

U.S. PATENT DOCUMENTS

| | | | | | |
|---|---|---|---|---|---|
| 5,231,484 | A | * | 7/1993 | Gonzales et al. | 375/240.04 |
| 5,552,832 | A | * | 9/1996 | Astle | 375/240.24 |
| 5,617,150 | A | | 4/1997 | Nam et al. | 348/700 |
| 5,686,963 | A | | 11/1997 | Uz et al. | 348/404 |
| 5,686,964 | A | | 11/1997 | Tabatabai et al. | 348/420 |
| 5,731,835 | A | | 3/1998 | Kuchibholta | 348/390 |
| 5,825,970 | A | * | 10/1998 | Kim | 386/109 |
| 5,990,957 | A | * | 11/1999 | Ryoo | 375/240.03 |
| 6,084,636 | A | * | 7/2000 | Sugahara et al. | 375/240.03 |
| 6,215,820 | B1 | * | 4/2001 | Bagni et al. | 375/240 |
| 6,654,417 | B1 | * | 11/2003 | Hui | 375/240.03 |

FOREIGN PATENT DOCUMENTS

| | | |
|---|---|---|
| JP | 06253277 | 9/1994 |
| JP | 10190745 | 7/1998 |
| JP | 10190946 | 7/1998 |
| JP | 10290426 | 10/1998 |
| JP | 10290427 | 10/1998 |
| JP | 10290428 | 10/1998 |
| JP | 10290429 | 10/1998 |

* cited by examiner

*Primary Examiner*—Andy Rao
(74) *Attorney, Agent, or Firm*—Baker Botts LLP

(57) ABSTRACT

A rate control apparatus for real-time video communication includes: an initialization unit for setting an initial value required for rate control according to a transmission speed and the number of input frames; a target bit calculation unit for obtaining the target number of encoding bits, maximum allowable number of bits, and minimum allowable number of bits in consideration of a buffer state and a transmission speed; a rate control and encoder unit for executing rate control and encoding using the maximum allowable number of bits and the minimum allowable number of bits; a stuffing control unit for comparing the size of a bit stream from the rate control and encoding unit with the target number of encoding bits from the target bit calculation unit for thereby outputting stuffing bits; a buffering unit for storing a combination of the bit stream from the rate control encoding unit and the stuffing bits from the stuffing control unit for thereby outputting them to the target bit calculation unit; a frame skip unit for outputting a frame skip signal according to the buffer occupied state signal from the buffering unit; and a control logic unit for controlling an encoding process of each of the above elements and determining whether or not the next input frame is encoded according to the frame skip signal from the frame skip unit.

29 Claims, 10 Drawing Sheets

RATE CONTROL APPARATUS AND METHOD FOR REAL-TIME VIDEO COMMUNICATION

FIELD OF THE INVENTION

The present invention relates to a rate control apparatus and method for a real-time video communication service, and more particularly, to a rate control apparatus and method for controlling bit rate by determining whether or not encoding is executed in units of macro-blocks to avoid overflow or underflow in encoder and decoder buffers and a recording medium which can be read by a computer having a program for realizing the method.

DESCRIPTION OF THE PRIOR ART

In order to transmit encoded video information in realtime via a transmission channel having a predetermined transmission speed, encoded and transmitted video information has to be controlled to have a predetermined bit-rate. For this purpose, instantly generated video information is stored at first, and then is transmitted to a decoder (or a receiver) at a predetermined speed using a buffer having a predetermined size. At this time, a method for controlling an encoder to avoid underflow or overflow in the buffer is referred to as a rate control method.

Rate control can be classified into a macro-block rate control method for controlling an image (frame) inputted at a predetermined time interval in units of frames and a method for controlling blocks in units of blocks in a case that an inputted video is divided into blocks of a predetermined size and is encoded in unit of each block. At this time, an encoding unit block is referred to as a macro-block. Generally, the macro-block rate control method is implemented in the form that frame unit calculation and macro-block unit calculation are mixed with each other. The macro-block rate control apparatus and method according to the conventional art will now be described with reference to FIG. 1.

FIG. 1A is an exemplary view of the construction of a conventional rate control apparatus, which shows a calculation module in units of frames.

As illustrated therein, an initialization module 110 is executed only once at the start of encoding, and an initial value required for rate control is set upon receipt of the bit rate of the transmission channel and the frame rate of an image from the outside to be delivered to a target bit calculation module 120.

The target bit calculation module 120 determines the target number of encoding bits of a frame to be currently encoded in consideration of the current state of the buffer and the transmission speed of the transmission channel, and outputs the same to a macro-block rate control and encoder module 130. At this time, the current state of the butter can be received directly from buffer modules 140, or can be calculated from the transmission speed, number of encoding bits of the previous frame, and butter state in the previous frame.

The macro-block rate control and encoder module 130 controls an encoding process in units of macro-blocks, said encoding units being smaller than frames, so as to output a bit stream having the number of encoding bits close to the target number of encoding bits received from the target bit calculation module 120, which will be described in detail with reference to FIG. 1B.

The buffer module 140 receives a bit stream outputted from the macro-block rate control and encoder module 130, stores the same, transmits it to a decoder via a transmission channel, and, if necessary, delivers a buffer occupied state signal to the target bit calculation module 120. The bit stream inputted to the buffer module 140 has a variable length in general, and the speed transmitted via the transmission channel is variable or fixed according to the characteristics of the transmission channel.

A frame skip module 150 receives the current state of the buffer from the buffer module 140 in a case that encoding of one frame is completed, and outputs a frame skip signal to a control logic module 160 so that the next input frame is not encoded in order to avoid the loss of video information due to the overflow in the buffer in a case that the state that bit streams are stuffed in the buffer exceeds a predetermined limit.

The control logic module 160 serves to control the entire process of encoding, in particular- determine whether or not the next input frame is encoded upon receipt of a frame skip signal from the frame skip module 150 for the purpose of rate control.

FIG. 1B is an exemplary view of the detailed construction of the macro-block rate control and encoder module 130 of FIG. 1*a*, which shows a process of executing the control of macro-block calculation and encoding. Here, all functional blocks execute calculation in units of macro-blocks.

As illustrated therein, a quantization parameter calculation module 131 receives a target bit rate per frame (a target number of encoding bits) from the target bit calculation module 120, and receives a model information (parameter) for calculating a quantization parameter from a model update module 133, thus outputting the quantization parameter(QP) for quantizing macro-blocks to an encoding module 132.

The encoding module 132 is a module that executes actual encoding upon receipt of a quantization parameter from the quantization parameter calculation module 131 for thereby delivers the size of a bit stream to the model update module 133, and delivering the bit stream to the buffer module 140, which module includes a converter, quantizer, and variable length encoder.

The model update module 133 receives the size of an encoded bit stream of each macro-block from the encoding module 132, and receives a quantization parameter from the quantization parameter calculation module 131, for thereby outputting an updated quantization model parameter, so that the quantization parameter calculation module 131 can be used as an input value for calculation the quantization parameter of the next input macro-block.

As described above, the description of the conventional rate control method is characterized in that a quantization parameter is outputted to effectively control the transmission rate due to a transmission channel. However, there is a disadvantage that only the buffer state of the encoder is considered without consideration of the buffer state of the decoder inevitably required for a real-time video transmission. In addition, there is a disadvantage that underflow or overflow in the buffer can occur because the method takes no consideration of an exceptional case that the number of actually encoded bits becomes larger than the target number of bits.

SUMMARY OF THE INVENTION

Accordingly, it is an object of the present invention to provide a rate control apparatus and method for controlling bit rate by deciding whether or not encoding is executed in units of macro-blocks by setting the target number of bits and obtaining the maximum allowable number of bits and the minimum allowable number of bits to avoid overflow or underflow in encoder and decoder buffers and a recording medium which can be read by a computer having a program for realizing the method.

To achieve the above object, there is provided a rate control apparatus according to the present invention, in a rate control apparatus for real-time video communication, which includes: an initialization unit for setting an initial value required for rate control according to a transmission speed and the number of input frames; a target bit calculation unit for obtaining the target number of encoding bits, maximum allowable number of bits, and minimum allowable number of bits in consideration of a buffer state and a transmission speed; a rate control and encoder unit for executing rate control and encoding using the maximum allowable number of bits and the minimum allowable number of bits; a stuffing control unit for comparing the size of a bit stream from the rate control and encoding unit with the target number of encoding bits from the target bit calculation unit for thereby outputting stuffing bits; a buffering unit for storing a combination of the bit stream from the rate control encoding unit and the stuffing bits from the stuffing control unit for thereby outputting them to the target bit calculation unit; a frame skip unit for outputting a frame skip signal according to the buffer occupied state signal from the buffering unit; and a control logic unit for controlling an encoding process of each of the above elements and determining whether or not the next input frame is encoded according to the frame skip signal from the frame skip unit.

Meanwhile, there is provided a rate control method adapted to the rate control apparatus for real-time video communication according to the present invention, which includes: a first step of setting an initial value required for rate control according to the transmission speed of a transmission channel and the frame rate of an image to be encoded; a second step of obtaining the target number of encoding bits, maximum allowable number of bits, and minimum allowable number of bits in consideration of the current state of a buffer and the transmission speed of the transmission channel; a third step of executing rate control and encoding using the target number of encoding bits, maximum allowable number of bits, and minimum allowable number of bits; a fourth step of comparing the size of an encoded bit stream with the target number of encoding bits for thereby outputting meaningless stuffing bits; a fifth step of storing a combination of the encoded bit stream and the stuffing bits and making video information transmitted; and a sixth step of determining whether or not the next input frame is encoded according to a frame skip signal generated according to the current state of the buffer.

Meanwhile, there is provided a recording medium according to the present invention, in a rate control apparatus having a process, for rate control for real-time video communication, which can be read by a computer having a program for realizing: a first function of setting an initial value required for rate control according to the transmission speed of a transmission channel and the frame rate of an image to be encoded; a second function of obtaining the target number of encoding bits, maximum allowable number of bits, and minimum allowable number of bits in consideration of the current state of a buffer and the transmission speed of the transmission channel; a third function of executing rate control and encoding using the target number of encoding bits, maximum allowable number of bits, and minimum allowable number of bits; a fourth function of comparing the size of an encoded bit stream with the target number of encoding bits for thereby outputting meaningless stuffing bits; a fifth function of storing a combination of the encoded bit stream and the stuffing bits and making video information transmitted; and a sixth function of determining whether or not the next input frame is encoded according to a frame skip signal generated according to the current state of the buffer.

In this way, in the present invention, a bit rate control is carried out by obtaining the maximum allowable number of bits and the minimum allowable number of bits, and then determining whether or not encoding is executed using the obtained numbers.

In a case that the number of encoding bits exceeds the maximum allowable number of bits in encoding of an input video signal, overflow in the buffer is generated for thereby losing video information. To avoid the overflow in the buffer, therefore, a method in which parts or all of the video information in macro-blocks are not encoded is used.

For example, there is a method in which all subsequent macro-blocks are not encoded after the number of encoding bits exceeds the maximum allowable number of bits, so that the number of encoding bits exceeds the limit. In other words, in a case that the total number of encoding bits of a bit stream accumulated until the currently encoded macro-block is reached exceeds the maximum allowable number of bits, the bit stream in the currently encoded macro-block is discarded so that the length of the bit stream does not exceed the maximum allowable number of bits. In addition, in a case that the bit stream in the currently encoded macro-block is discarded as above, the bit stream in the currently macro-block is discarded and a bit stream showing that the current macro-block is not encoded is added to be delivered to a decoder.

Meanwhile, in a case that the number of encoding bits of a frame is less than the minimum allowable number of bits, a method in which a bit stream is extended larger than the gab between the minimum allowable number of bits and the number of frame bits is used.

For example, in a case that the number of encoding bits is less than the minimum allowable number of bits, meaningless data (which is, therefore, ignored by the decoder, e.g., the bit stream is read out and then is discarded) stuffs the gap to thus avoid underflow in the buffer.

Meanwhile, in a case that the total number of encoding bits of a bit stream accumulated until the currently encoded macro-block is reached exceeds the allowable limit calculated from the maximum allowable number of bits, target number of encoding bits, or minimum allowable number of bits, a method in which picture information is not encoded so that the length of the bit stream does not exceed the maximum allowable number of bits is used.

Additional advantages, objects and features of the invention will become more apparent from the description which follows.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

The preferred embodiment of the present invention will now be described with reference to the accompanying drawings.

Figure 1A:
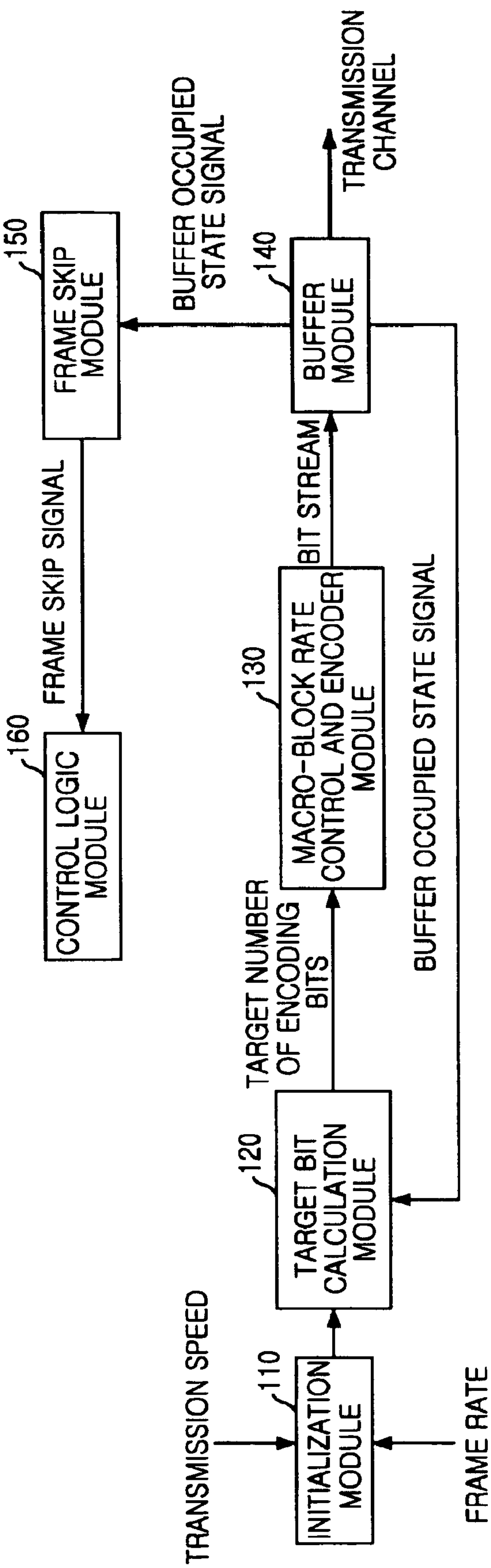
FIG. 1A is an exemplary view of the detailed construction of a conventional rate control apparatus.
Figure 1B:
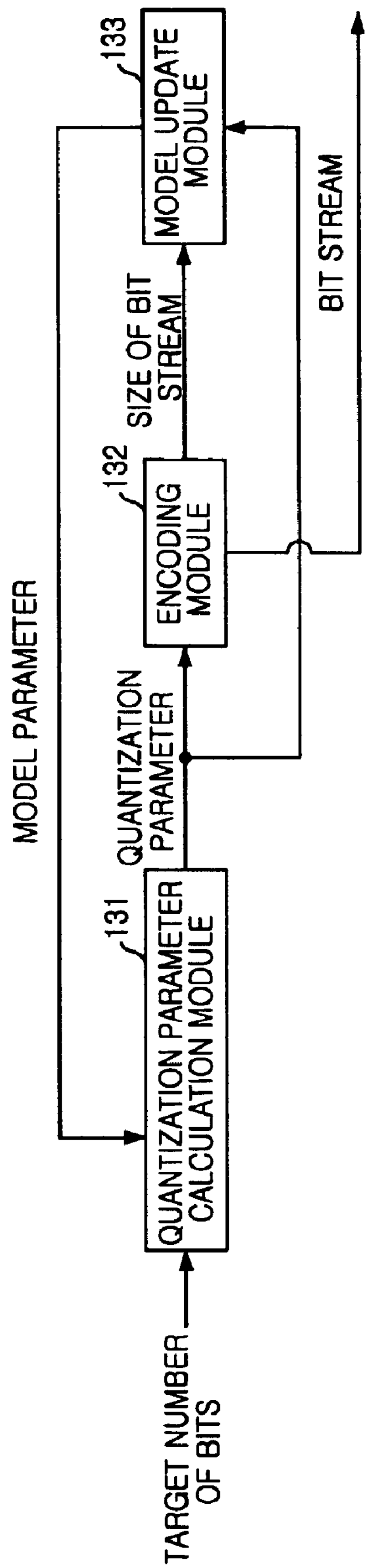
FIG. 1B is an exemplary view of the detailed construction of a macro-block rate control and encoder module of FIG. 1.
Figure 2A:
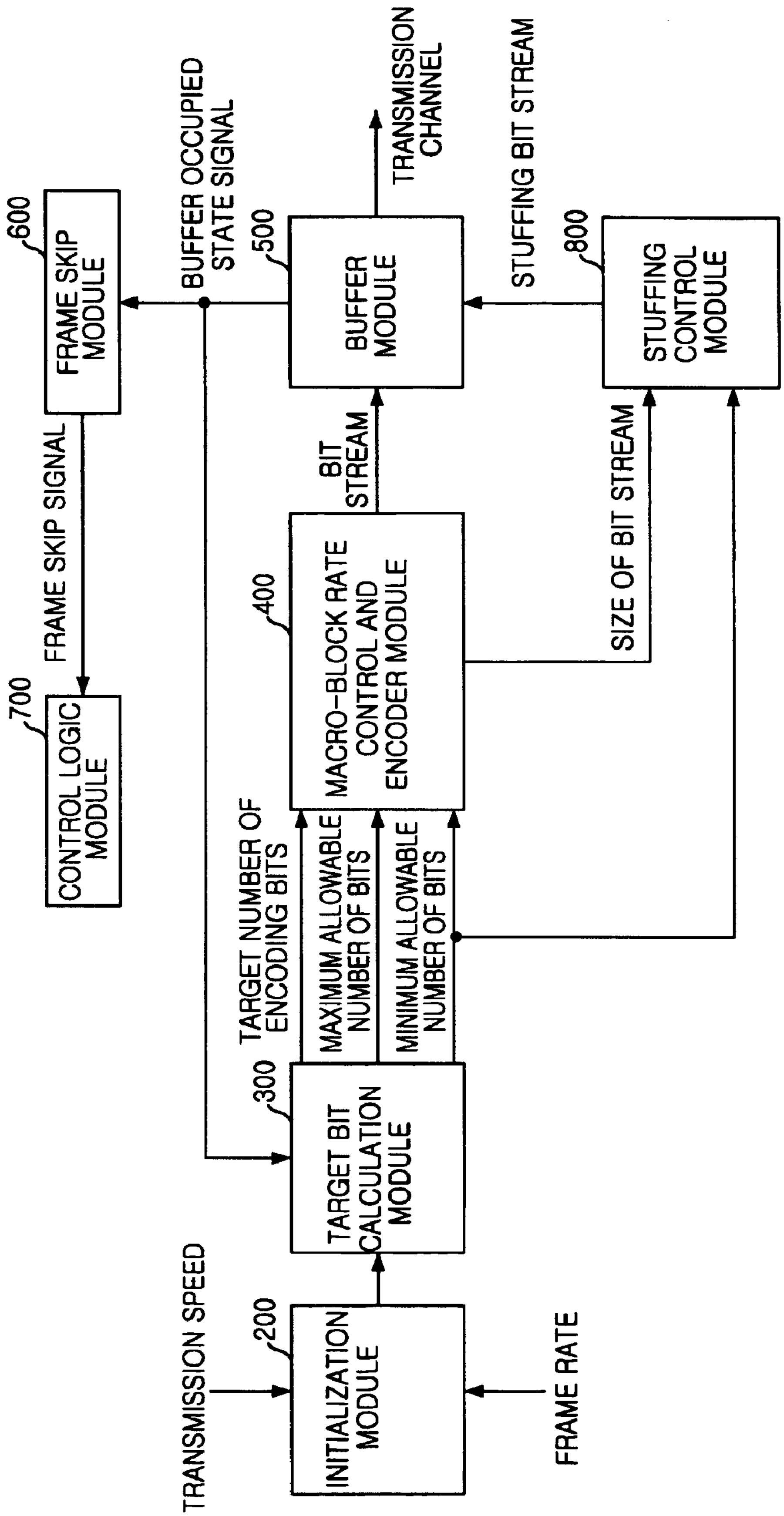
FIG. 2A illustrates the detailed construction of a rate control apparatus for real-time video communication according to a first embodiment of the present invention.

FIG. 2A illustrates the detailed construction of a rate control apparatus for real-time video communication according to a first embodiment of the present invention, which shows a frame rate control calculation module.

The rate control apparatus for real-time video communication according to the present invention includes: an initialization module 200 for setting an initial value required for rate control upon receipt of the transmission speed of a transmission channel and the frame rate of an image to be encoded; a target bit calculation module 300 for obtaining and outputting the target number of encoding bits, maximum allowable number of bits, and minimum allowable number of bits in consideration of the current state of a buffer and the transmission speed of the transmission channel; a rate control and encoder module 400 for executing rate control and encoding using the maximum allowable number of bits and the minimum allowable number of bits from the target bit calculation module 300; a stuffing control module 800 for comparing the size of a bit stream from the macro-block rate control and encoder module 400 with the target number of encoding bits from the target bit calculation module 300 for thereby outputting stuffing bits; a buffer module 500 for storing a combination of the bit stream from the macro-block rate control encoding module and the stuffing bits from the stuffing control module 800 for thereby outputting them to the target bit calculation module 300 and transmitting video information to a decoder; a frame skip module 600 for outputting a frame skip signal upon receipt of the buffer occupied state signal from the buffer module 500 in a case that the buffer state exceeds a predetermined limit; and a control logic module 700 for controlling the entire encoding process and determining whether or not the next input frame is encoded upon receipt of the frame skip signal from the frame skip module 600.

The construction and operation of such a rate control apparatus and method will now be describe in more detail with reference to FIG. 2A.

The target bit calculation module 300 calculates the target number of encoding bits, and outputs the same to the macro-block rate control and encoder module 400, in order to avoid underflow or overflow in encoder and decoder buffers. At the same time, the maximum allowable number of bits and the minimum allowable number of bits are calculated and are outputted to the macro-block rate control and encoder module 400, whereby subsequent modules make the number of generated bits positioned between the maximum allowable number of bits and the minimum allowable number of bits by referring to these numbers. At this time, the minimum allowable number of bits(Min_bit) is expressed by equation (1), and the maximum allowable number of bits (Max_bit) is expressed by equation (2).

$$\text{Min\_bit}=\max\{B_{fd}+B_a-B_d,\ B_a-B_{fe},\ 0\} \quad (1)$$

$$\text{Max\_bit}=\min\{B_{fd},\ B_e-B_{fe}\} \quad (2)$$

wherein $B_{fd}$ denotes the stuffed state of the decoder buffer, which is represented as a value calculated from the encoder because it cannot be directly measured by the encoder, $B_a$ denotes the number of bits of the bit stream transmitted from the buffer during encoding of one frame, $B_d$ denotes the size of the decoder buffer, $B_e$ denotes the size of the encoder buffer, $B_{fe}$ denotes the stuffed state of the encoder buffer. In addition, min{ } denotes a function for outputting the minimum value of elements, max{ } denotes a function for outputting the maximum value of elements.

The macro-block rate control and encoder module 400 encodes an input image upon receipt of the target number of encoding bits, maximum allowable number of bits, and minimum allowable number of bits outputted from the target bit calculation module 300, for thereby outputting a bit stream to the buffer module 500 and outputting the size of the bit stream to the stuffing control module 800. This will be described in detail with reference to FIG. 2B.

The stuffing control module 800 outputs a stuffing bit stream (meaningless data) is outputted to the buffer module 500 as much as the number of bits more than the gap between the size of the bit stream and the minimum allowable number of bits, in a case that the size of the bit stream is smaller than the minimum allowable number of bits, upon receipt of the minimum allowable number of bits from the target bit calculation module 300, and the size of the bit stream from the macro-block rate control and encoder module 400. The buffer module 500 transmits video information to the decoder via the transmission channel by combining the size of the bit stream and the minimum allowable number of bits.

The present invention is not limited by the concrete method of the above-described target bit calculation. However, the most important concept of the present invention is that the maximum allowable number of bits and the minimum allowable number of bits are previously determined and rate control is executed by using them, while rate control is executed by using only the target number of encoding bits in the conventional art.

Figure 2B:
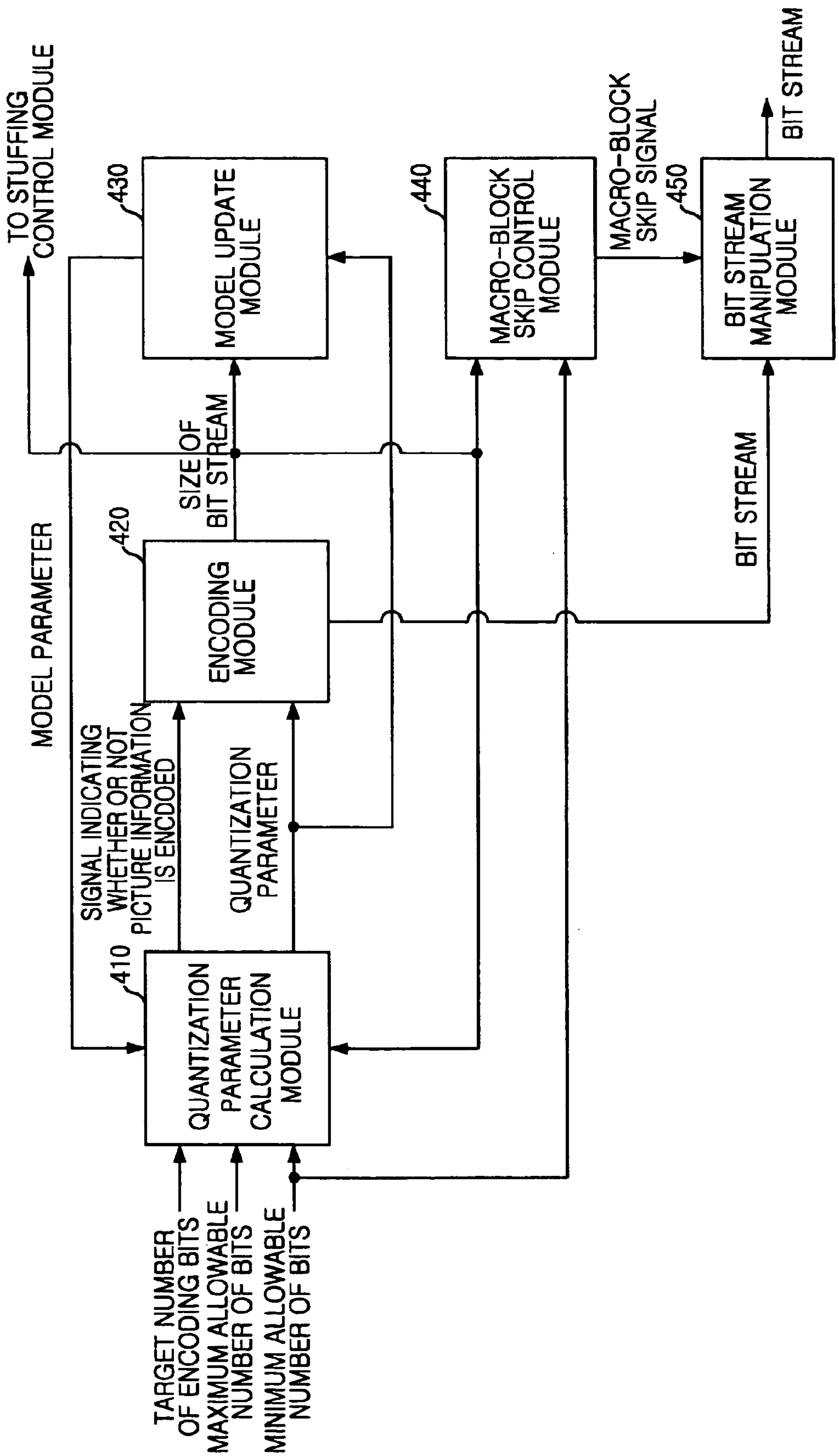
FIG. 2B illustrates the detailed construction of a macro-block rate control and encoder module of FIG. 2A according to the first embodiment of the present invention.

FIG. 2B illustrates the detailed construction of the macro-block rate control and encoder module 400 of FIG. 2A according to the first embodiment of the present invention, which shows the process of executing the control of macro-block rate control calculation and encoding.

The macro-block rate control and encoder module according to the present invention includes: a quantization parameter calculation module 410 for determining a quantization parameter and a signal indicating whether or not picture information of the corresponding macro-block is encoded (texture_coded) upon receipt of the target number of encoding bits, maximum allowable number of bits, and minimum allowable number of bits from the target bit calculation module 300, upon receipt of the size of the bit stream of the previous macro-block from the encoding module 420, and upon receipt of a model parameter from the model update module 430; an encoding module for determining the width of quantization of a transform coefficient according to the quantization parameter from the quantization parameter calculation module 410 and for encoding picture information according to the signal indicating whether or not picture information is encoded; a model update module 430 for updating a model upon receipt of the size of the bit stream from the encoding module 420 and upon receipt of the quantization parameter from the quantization parameter calculation module 410 for thereby outputting a model parameter to the quantization parameter calculation module 410; a macro-block skip control module 440 for determining whether or not a macro-block is skipped upon receipt of the size of the bit stream from the encoding module 420 and upon receipt of the maximum allowable number of bits from the target bit calculation module 300 for thereby outputting a macro-block skip signal; and a bit stream manipulation module 450 for combining the macro-block skip signal from the macro-block skip control module 440 and the bit stream from the encoding module 420.

The construction and operation of such a macro-block rate control and encoder module 400 will now be described in detail with reference to FIG. 2B.

The quantization parameter calculation module 410 outputs the quantization parameter for quantizing an input macro-block and the signal indicating whether or not picture information of the corresponding macro-block is encoded (texture_coded), upon receipt of the target number of encoding bits, maximum allowable number of bits, and minimum allowable number of bits from the target bit calculation module 300, upon receipt of the number of encoding bits of the previous macro-block from the encoding module 420, and upon receipt of the model parameter from the model update module 430. At this time, in a case that the number of currently accumulated bits exceeds the maximum allowable number of bits, the signal indicating whether or not picture information of the corresponding macro-block is encoded (texture_coded) is outputted to the encoding module 420 so as not to encode the picture information.

The output from the quantization parameter calculation module 410 is inputted to the encoding module 420 to thus be used in quantization of transform coefficients. In other words, the quantization width of the transform coefficient is determined, and the picture information is encoded according to the signal indicating whether or not picture information is encoded. At this time, in a case that the picture information is not encoded, only the remaining video information (motion information, shape information, etc.) excepting the picture information is encoded.

The model update module 430 updates a model expressing the relation between the quantization parameter and the number of generated bits upon receipt of the bit stream from the encoding module 420 and the quantization parameter from the quantization parameter calculation module 410, for thereby outputting a model parameter to the quantization parameter calculation module 410, so that the model parameter is used in determining the quantization parameter for the next input macro-block.

The macro-block skip control module 440 outputs a macro-block skip signal to the bit stream manipulation module 450 so as to discard the bit stream for the current macro-block, in a case that the size of the bit rate accumulated until the current macro-block is reached, upon receipt of the size of the bit stream of the input macro-block from the encoding module 420 and upon receipt of the maximum allowable number of bits from the target bit calculation module 300.

The bit stream manipulation module 450 discards an inputted bit stream in a case that a macro-block skip signal for discarding the bit stream of the current macro-block, and then outputs only the information showing that the current input macro-block is not encoded to the buffer module 500 by attaching the same to the bit stream.

Figure 3:
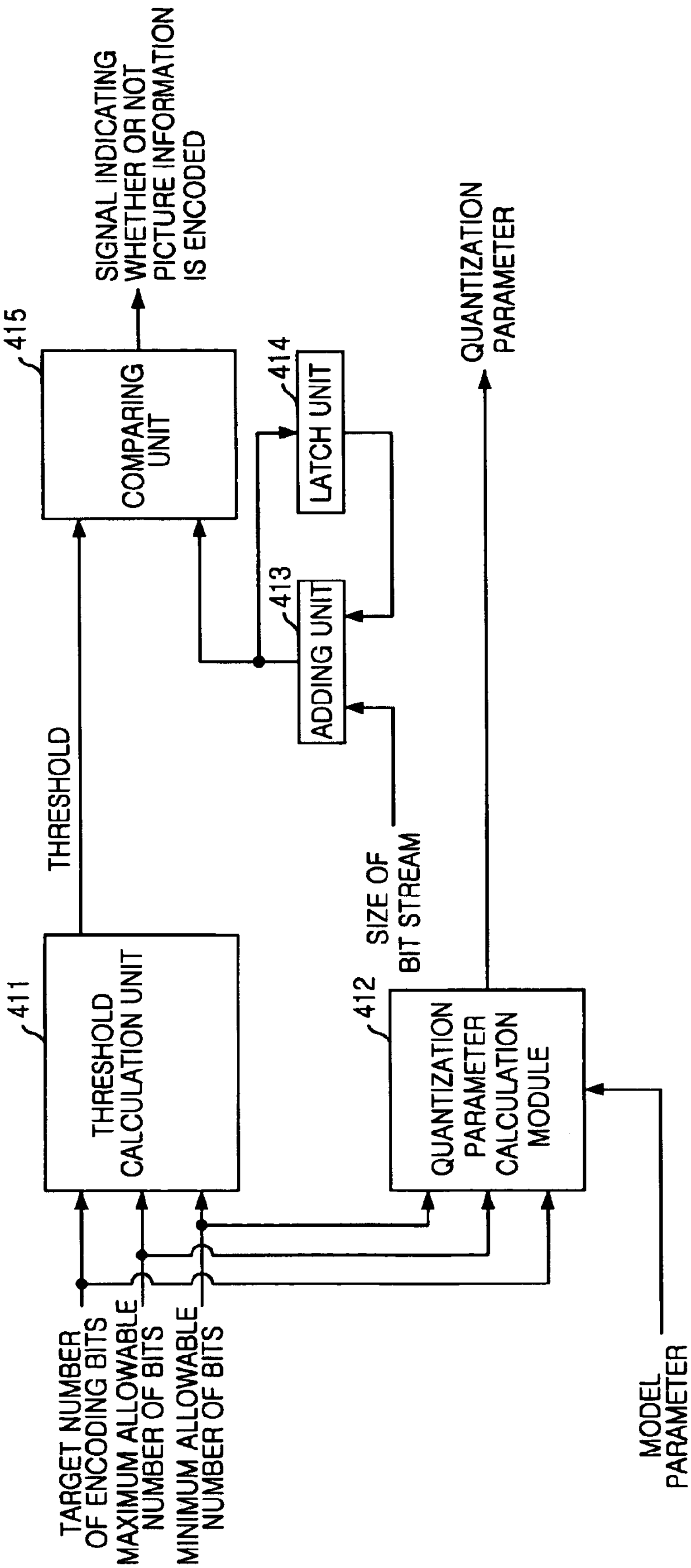
FIG. 3 illustrates the detailed construction of a quantization parameter calculation module of FIG. 2B according to the first embodiment of the present invention.

FIG. 3 illustrates the detailed construction of the quantization parameter calculation module 410 of FIG. 2B according to the first embodiment of the present invention.

The quantization parameter calculation module 410 according to the present invention includes: a threshold calculation unit 411 for calculating a threshold according to the target number of encoding bits, maximum allowable number of bits, and minimum allowable number of bits from the target bit calculation module 300; a quantization parameter calculation unit 412 for calculating a quantization parameter (QP) according to the target number of encoding bits (target_bit), maximum allowable number of bits (max_bit), and minimum allowable number of bits (min_bit) from the target bit calculation module 300 and a model parameter from the model update module 430; a latch unit 414 for storing the number of accumulated bits; an adding unit 413 for adding the size of the bit stream of the previous macro-block and the number of accumulated bits from the latch unit 414 for thereby outputting the sum thereof to the latch unit 414 and a comparing unit 415; and the comparing unit 415 for comparing the number of accumulated bits from the adding unit 413 with the threshold from the threshold calculation unit 411 for thereby determining whether or not a macro-block is encoded.

The construction and operation of such a quantization parameter calculation module 410 will now be described in detail with reference to FIG. 3.

As illustrated in FIG. 3, the threshold calculation unit 411 calculates a threshold upon receipt of the target number of encoding bits (target_bit), maximum allowable number of bits (max_bit), and minimum allowable number of bits (min_bit) from the target bit calculation module 300.

In addition, the quantization parameter calculation unit 412 calculates a quantization parameter (QP) upon receipt of the target number of encoding bits (target_bit), maximum allowable number of bits (max_bit), and minimum allowable number of bits (min_bit) from the target bit calculation module 300, for thereby outputting the same to the encoding module 420.

Here, in obtaining the threshold and quantization parameter, they can be calculated by using all or parts of the three kinds of number of bits.

In addition, the latch unit 414 firstly stores the number of bits, and then outputs the same to the adding unit 413.

In addition, the adding unit 413 adds the size of the bit stream of the previous macro-block from the encoding module 420 and the number of accumulated bits stored in the latch unit 414, for thereby outputting the sum thereof to the comparing unit 415. In addition, in order to process the next macro-block, the number of accumulate bits is stored in the latch unit 414 by re-inputting the same thereto. At this time, the number of accumulated bits stored in the latch unit 414 is initialized to "0" after encoding of one frame is completed, for thereby making it possible to store the number of accumulated bits of the next frame.

In addition, the comparing unit 415 compares the number of accumulated bits from the adding unit 413 with the threshold from the threshold calculation unit 411, and then outputs a signal indicating whether or not picture information is encoded, so as to encode the picture information, in a case that the number of accumulated bits is less than the threshold, or outputs a signal indicating whether or not picture information is encoded, so as to avoid overflow of the buffer, in a case that the number of accumulated bits is larger than the threshold.

Figure 4:
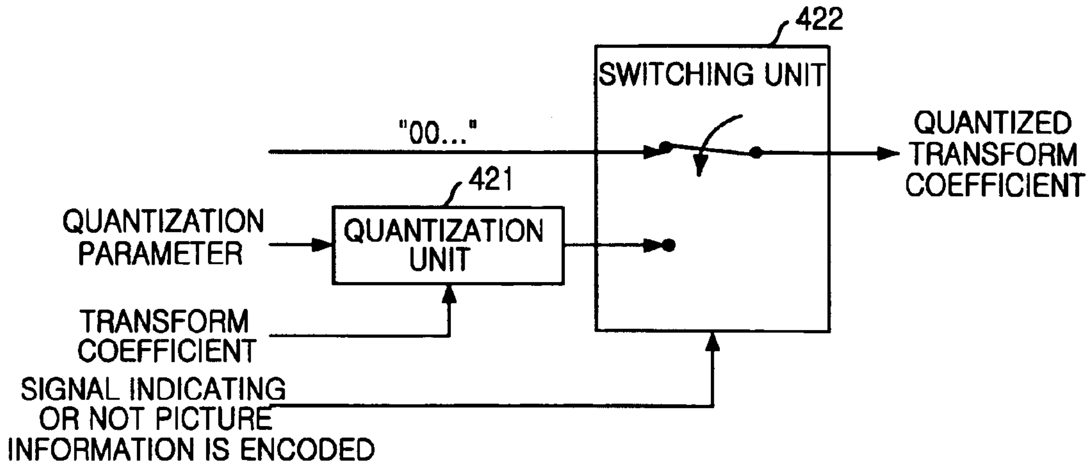
FIG. 4 illustrate the detailed construction of a quantizer of an encoding module of FIG. 2B according to the first embodiment of the present invention.

FIG. 4 illustrate the detailed construction of a quantizer of the encoding module 420 of FIG. 2B according to the first embodiment of the present invention.

The quantizer according to the present invention includes a quantization unit 421 for quantizing a transform coefficient according to the quantization parameter from the quantization parameter calculation module 410 and a switching unit 422 for selecting either one of a meaningless data set to "0" and the quantized transform coefficient of the quantization unit 421 according to the signal indicating whether or not picture information is encoded from the quantization parameter calculation module 410 for outputting the same.

The construction and operation of such a quantizer will now be described in detail with reference to FIG. 4.

First, in a case that the signal indicating whether or not picture information is encoded for encoding the picture information is inputted, the transform coefficient inputted to the quantization unit 421 is quantized according to the quantization parameter from the quantization parameter calculation module 410 to be delivered to the switching unit 422, and the switching unit 422 is switched such that the quantized transform coefficient is outputted.

Meanwhile, in a case that the signal indicating whether or not picture information is encoded for not encoding the picture information is inputted, data set to "0" is delivered to the switching unit 422, and the switching unit is switched such that the data set to "0" is outputted.

Figure 5:
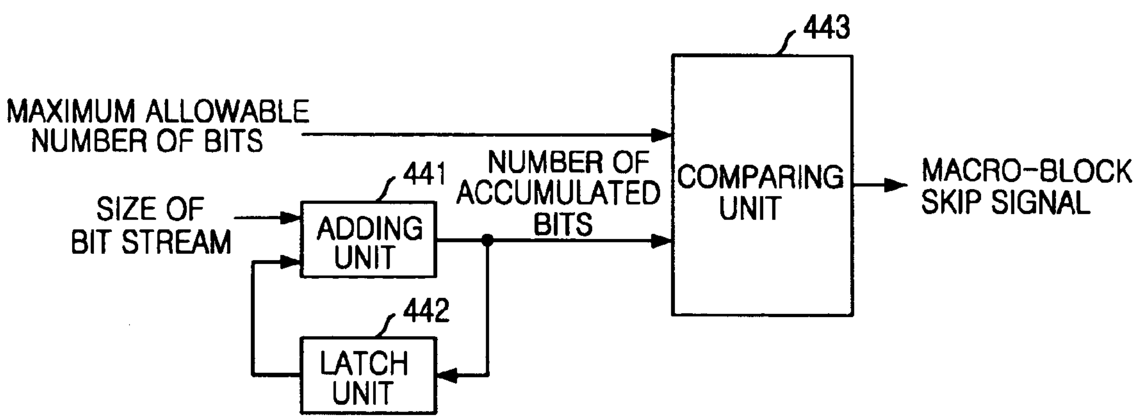
FIG. 5 illustrates the detailed construction of a macro-block skip control module of FIG. 2B according to the first embodiment of the present invention.

FIG. 5 illustrates the detailed construction of the macro-block skip control module 440 of FIG. 2B according to the first embodiment of the present invention.

The macro-block skip control module according to the present invention includes a latch unit 442 for storing the number of accumulated bits, an adding unit 441 for adding the size of the bit stream of the current macro-block from the encoding module 420 and the number of accumulated bits from the latch unit 442 for thereby outputting the sum thereof to the latch unit 442 and the comparing unit 443, and the comparing unit 443 for comparing the number of accumulated bits from the adding unit 441 with the maximum allowable number of bits from the target bit calculation module 300 for thereby determining whether or not the current macro-block is transmitted.

The construction and operation of such a macro-block skip control module 440 will now be described in detail with reference to FIG. 5.

As illustrated in FIG. 5, the adding unit 441 outputs the number of bits accumulated until the current macro-block is reached, upon receipt of the number of bits of the current macro-block and the number of accumulated bits stored in the latch unit 442. The number of accumulated bits calculated by the adding unit 441 is inputted to the comparing unit 443 along with the maximum allowable number of bits (max_bit) from the target bit calculation module 300 for thereby outputting whether or not the bit stream for the current macro-block is transmitted. In other words, in a case that the number of accumulated bits is less than the maximum allowable number of bits, a macro-block skip signal is outputted so that the bit stream for the current macro-block is directly transmitted, or in a case that the number of accumulated bits is larger than the maximum allowable number of bits, a macro-block skip signal is outputted so that the bit stream for the current macro-block is not outputted.

At this time, the number of accumulated bits calculated by the adding unit 441 is stored again in the latch unit 442 so as to calculated the number of bits accumulated until the next macro-block is reached. In addition, the value stored in the latch unit 442 is initialized to "0" in a case that encoding of a frame is completed, and thereafter is used to calculate the number of accumulated bits of the next frame.

Figure 6:
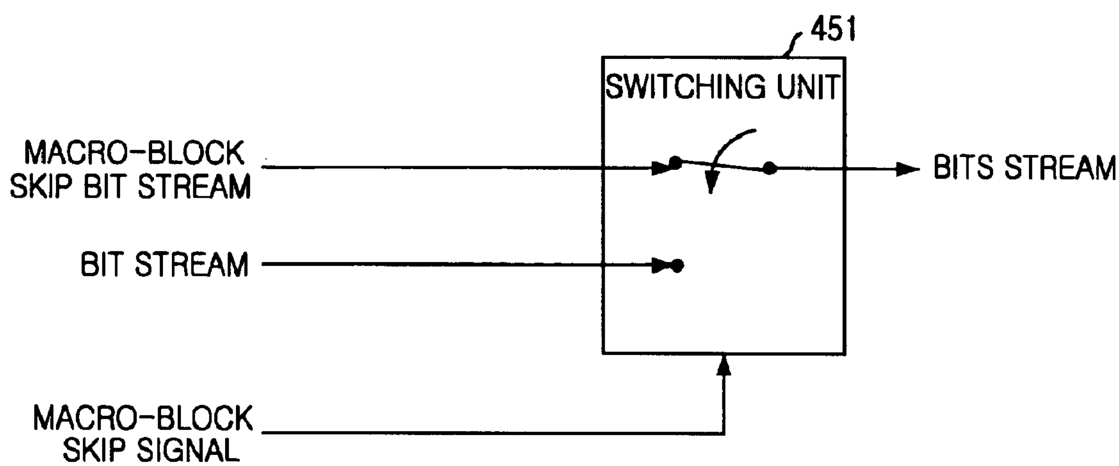
FIG. 6 illustrates the detailed construction of a bit stream manipulation module of FIG. 2B according to the first embodiment of the present invention.

FIG. 6 illustrates the detailed construction of the bit stream manipulation module 450 of FIG. 2B according to the first embodiment of the present invention, which shows a bit stream manipulation function block for manipulating the bit stream for the current macro-block according to a macro-block skip signal.

As illustrated in FIG. 6, the bit stream manipulation module 450 includes a switching unit 451 for selecting and outputting a macro-block skip bit stream when a macro-block skip signal for making the current macro-block not transmitted is inputted from the macro-block skip module 440, or selecting and outputting a bit stream when a macro-block skip signal for transmitting the current macro-block is inputted therefrom, upon receipt of the encoded bit stream from the encoding module 420, or upon receipt of the macro-block skip bit stream indicating that the current macro-block is not encoded.

Meanwhile, the decoder judges whether or not the corresponding macro-lock is skipped, upon receipt of a macro-block skip signal during executing encoding of bit streams in order. If skipped, the corresponding macro-block is reproduced by an established method. For example, in a case that the current macro-block is skipped, it can be reproduced by using a macro-block signal at the same position as the previously reproduced image.

Figure 7:
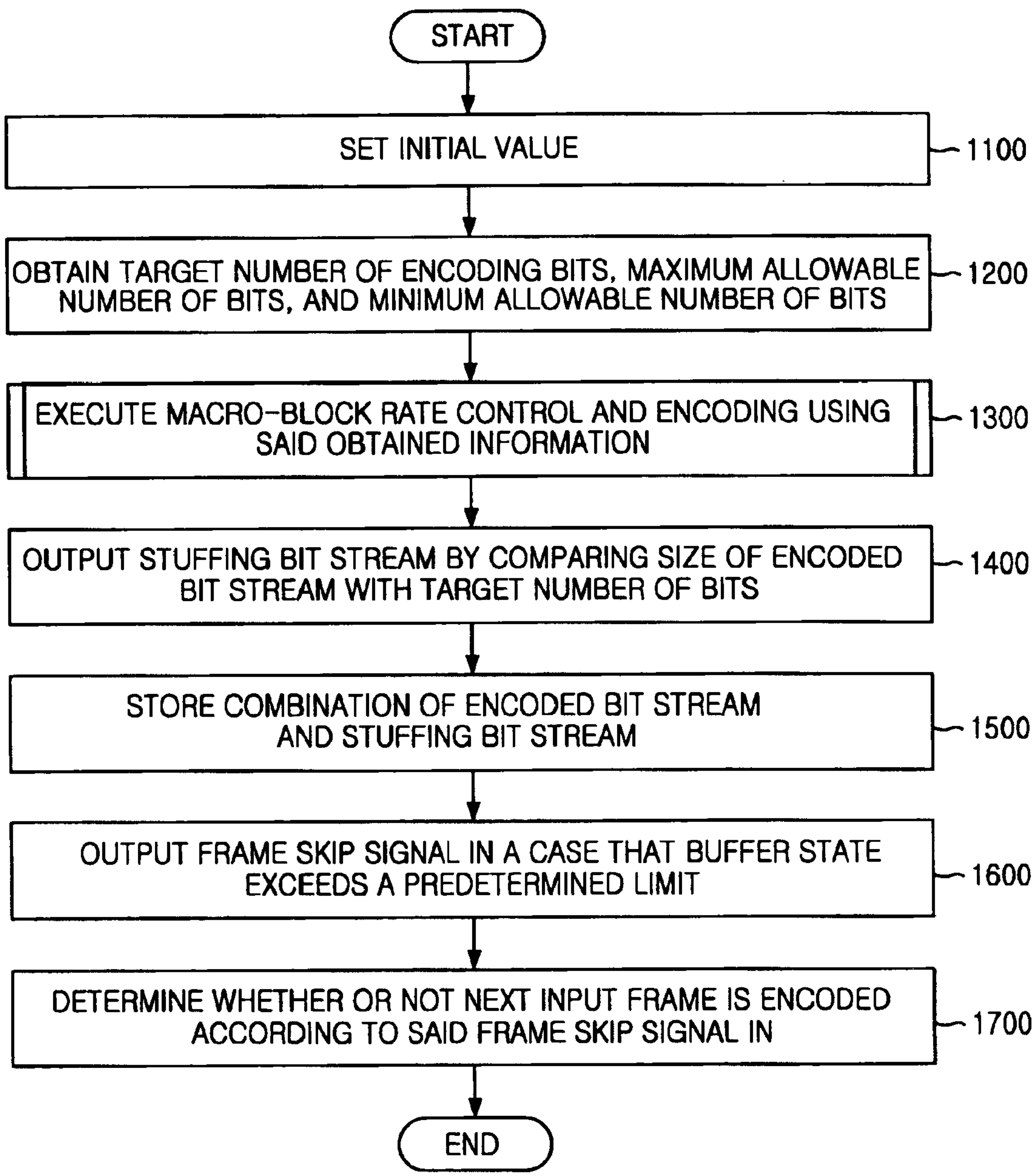
FIG. 7 illustrates the flow chart of a rate control method for real-time video communication according to the first embodiment of the present invention.

FIG. 7 illustrates the flow chart of the rate control method for real-time video communication according to the first embodiment of the present invention.

First, the initialization module 200 sets an initial value required for rate control upon receipt of the transmission speed of a transmission channel and the frame rate of an image to be encoded in step 1100. In addition, the target bit calculation module 300 obtains the target number of encoding bits, maximum allowable number of bits, and minimum allowable number of bits in consideration of the current state of the buffer and the transmission speed of the transmission channel for thereby outputting them in step 1200.

In addition, the macro-block rate control and encoder module 400 executes macro-block rate control and encoding using the target number of encoding bits, maximum allowable number of bits, and minimum allowable number of bits from the target bit calculation module 300 in step 1300. In addition, the stuffing control module 800 compares the size of the bit stream from the macro-block rate control and encoder module 400 with the target number of encoding bits from the target bit calculation module 300, and, in a case that the size of the bit stream is less than the minimum allowable number of bits, outputs stuffing bits in step 1400. In addition, the buffer module 500 stores a combination of the bit stream from the macro-block rate control and encoder module 400 and the stuffing bits from the stuffing control module 800, outputs a buffer occupied state signal to the target bit calculation module 300, and transmits video information to the decoder in step 1500.

In addition, the frame skip module 600 outputs a frame skip signal upon receipt of the buffer occupied state signal from the buffer module 500, in a case that the buffer state exceeds a predetermined limit in step 1600. In addition, the control module 700 controls the entire encoding process, and determines whether or not the next input frame is encoded, upon receipt of the frame skip signal from the frame skip module 600 in step 1700.

Figure 8:
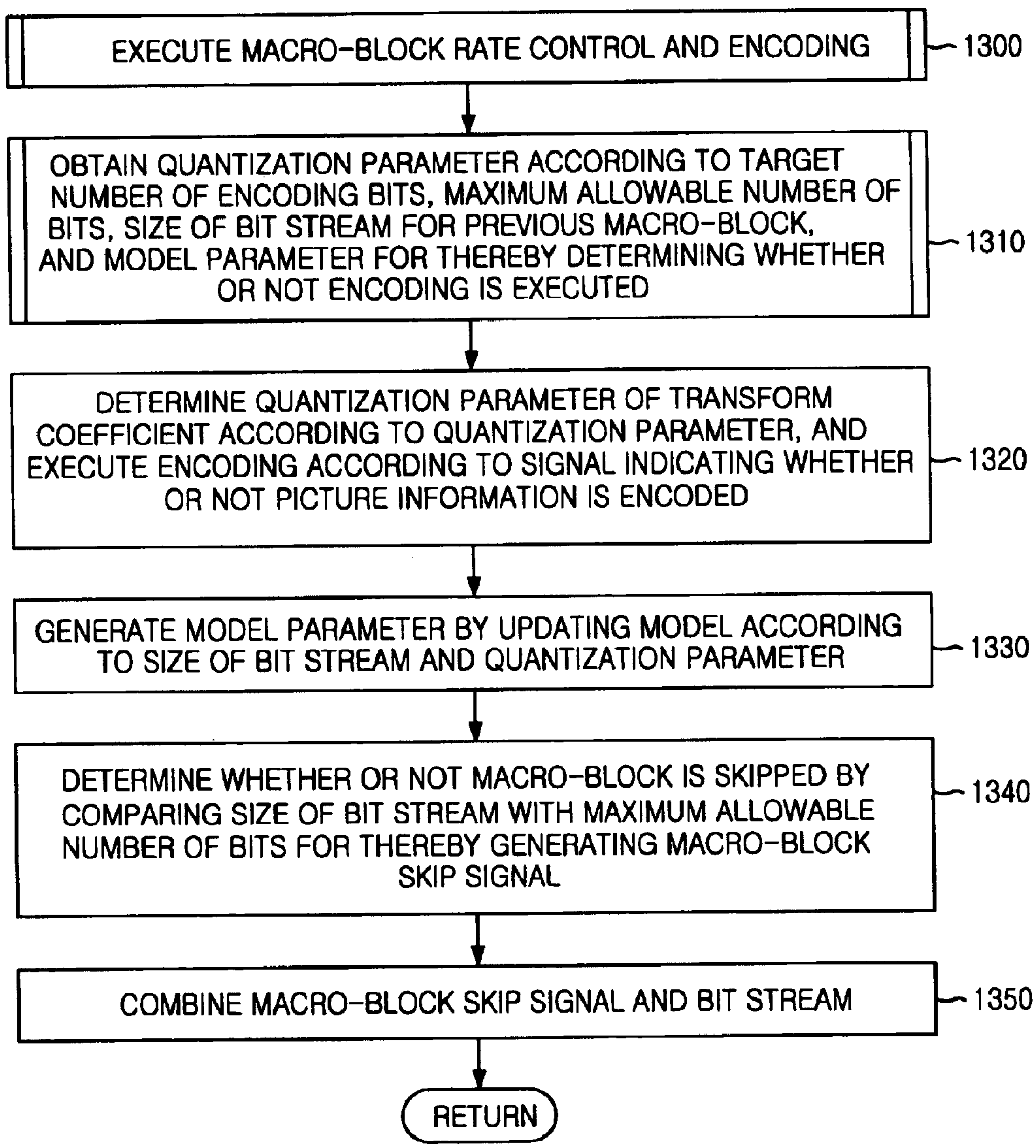
FIG. 8 illustrates the detailed flow chart of the step of executing macro-block rate control and encoding of FIG. 7 according to the first embodiment of the present invention.

FIG. 8 illustrates the detailed flow chart of the step 1300 of executing macro-block rate control and encoding of FIG. 7 according to the first embodiment of the present invention.

First, the quantization parameter calculation module 410 determines a qunatization parameter and whether or not the corresponding macro-block is encoded (texture_coded), upon receipt of the target number of encoding bits, maximum allowable number of bits, and minimum allowable number of bits from the target bit calculation module 300, upon receipt of the size of the bit stream for the previous macro-block from the encoding module 420, and upon receipt of a model parameter from the model update module 430 in step 1310.

In addition, the encoding module 420 determines the quantization width of a transform coefficient according to the quantization parameter from the quantization parameter calculation module 410, and encodes picture information according to the signal indicating whether or not the picture information is encoded in step 1320.

In addition, the model update module 430 updates a model upon receipt of the size of the bit stream from the encoding module 420 and upon receipt of the quantization parameter from the quantization parameter calculation module 410 for thereby outputting a model parameter to the quantization parameter calculation module 410 in step 1330.

In addition, the macro-block skip control module 440 receives the size of the bit stream from the encoding module 420 and the maximum allowable number of bits from the target bit calculation module 300, and determines whether or not a macro-block is skipped by comparing the two bit streams for thereby outputting a macro-block skip signal in step 1340.

In addition, the bit stream manipulation module 450 combines the macro-block skip signal from the macro-block skip control module 440 with the bit stream from the encoding module 420 in step 1350.

Figure 9:
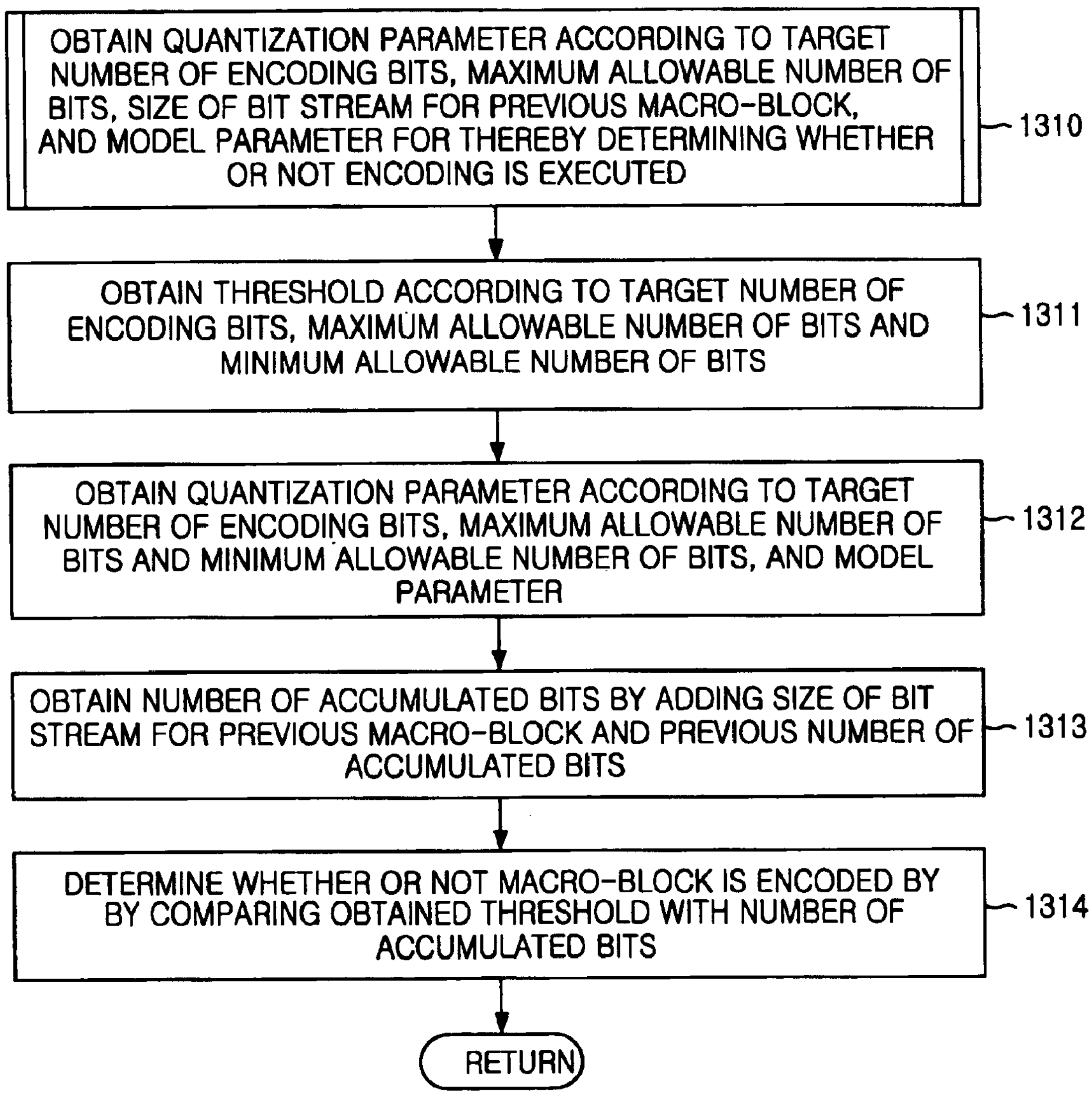
FIG. 9 illustrates the detailed flow chart of the step of determining a quantization parameter whether or not encoding is executed.

FIG. 9 illustrates the detailed flow chart of the step 1310 of determining a quantization parameter and whether or not encoding is executed of FIG. 8 according to the first embodiment of the present invention.

First, the threshold calculation unit 411 calculates a threshold according to the target number of encoding bits, maximum allowable number of bits, and minimum allowable number of bits from the target bit calculation module 300. In addition, the quantization parameter calculation unit 412 calculates a quantization parameter (QP) according to the target number of encoding bits, maximum allowable number of bits, and minimum allowable number of bits from the target bit calculation module 300 and a model parameter from the model update module 430.

In addition, the adding unit 413 obtains a new number of accumulated bits by adding the size of the bit stream for the previous macro-block from the encoding module 420 and the number of accumulated bits from the latch unit 414, for thereby outputting the sum thereof to the comparing unit 415.

In addition, the comparing unit 415 determines whether or not a macro-block is encoded by comparing the number of accumulated bits from the adding unit 413 and the threshold from the threshold calculation unit 411.

The thusly-described present invention is advantageous in that overflow or underflow in the encoder and decoder buffers can be prevented by controlling bit rate by setting a target number of bits, obtaining the maximum allowable number of bits and minimum allowable number of bits, and determining whether or not encoding is executed.

In a case that the present invention is adapted to a video encoding apparatus in such a manner, overflow or underflow in the encoder and decoder buffers can be prevented for thereby improving the quality of a reproduced image.

In addition, the present invention is particularly useful for a video communication service apparatus on a next generation's mobile communication network(IMT-200) or PSTN (Public Switched Telephone Network) having a low transmission rate characteristic.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A rate control apparatus for real-time video communication, the rate control apparatus comprising:

an initialization means for setting an initial value required for rate control according to a transmission speed and the number of input frames;

a target bit calculation means for obtaining the target number of encoding bits, maximum allowable number of bits, and minimum allowable number of bits in consideration of a buffer state and a transmission speed;

a rate control and encoder means for executing rate control and encoding using the maximum allowable number of bits and the minimum allowable number of bits;

a stuffing control means for comparing the size of a bit stream from the rate control and encoding means with the target number of encoding bits from the target bit calculation means for thereby outputting stuffing bits;

a buffering means for storing a combination of the bit stream from the rate control encoding means and the stuffing bits from the stuffing control means for thereby outputting them to the target bit calculation means;

a frame skip means for outputting a frame skip signal according to the buffer occupied state signal from the buffering means; and a control logic means for controlling an encoding process of each of the above elements and determining whether or not the next input frame is encoded according to the frame skip signal from the frame skip means, wherein the rate control and encoder means controls such that the length of a bit stream does not exceed the maximum allowable number of bits by not encoding picture information, in a case that the total number of encoding bits of the bit stream accumulated until the currently encoded macro-block is reached.

2. The apparatus as recited in claim 1, wherein the target bit calculation means obtains the minimum allowable number of bits by Min_bit=max $\{B_{fd}+B_a-B_d, B_a-B_{fe}, 0\}$, and the maximum allowable number of bits by MFax_bit=$\{B_{fd}, B_e-B_{fe}\}$, wherein $B_{fd}$ denotes the stuffed state of the decoder buffer, $B_a$ denotes the number of bits of the bit stream transmitted from the buffer during encoding of one frame, $B_d$ denotes the size of the decoder buffer, $B_e$ denotes the size of the encoder buffer, $B_{fe}$ denotes the stuffed state of the encode buffer, min { }denotes a function for outputting the minimum value of elements, and max { }denotes a function for outputting the maximum value of elements.

3. The apparatus as recited in claim 1, wherein the stuffing control means outputs a meaningless stuffing bit stream to the buffer module as much as the number of bits more than the gap between the size of the bit stream and the minimum allowable number of bits, in a case that the size of the bit stream is smaller than the minimum allowable number of bits by comparing the minimum allowable number of bits from the target bit calculation means with the size of the bit stream from the macro-block rate control and encoder means.

4. The apparatus as recited in claim 1, wherein the rate control and encoder means ensures that the length of a bit stream does not exceed the maximum allowable number of bits by discarding the bit stream for the currently encoded macro-block, in a case that the total number of bits of the bit stream accumulated until the currently encoded macro-block is reached.

5. The apparatus as recited in claim 4, wherein the rate control and encoder means adds a bit stream representing that the current macro-block is not encoded in a case that the bit stream for the current macro-block is discarded.

6. The apparatus as recited in claim 1, wherein the rate control and encoder means comprises:

a quantization parameter calculation means for determining a quantization parameter and a signal indicating whether or not picture information of the corresponding macro-block is encoded (texture_coded), upon receipt of the target number of encoding bits, maximum allowable number of bits, and minimum allowable number of bits from the target bit calculation means, upon receipt of the size of the bit stream of the previous macro-block from the encoding means, and upon receipt of a model parameter from the model update means;

an encoding module for determining the width of quantization of a transform coefficient according to the quantization parameter from the quantization parameter calculation means and for encoding pictures information according to the signal indicating whether or not picture information is encoded;

a model update means for updating a model upon receipt of the size of the bit stream from the encoding means and upon receipt of the quantization parameter from the quantization parameter calculation means for thereby outputting a model parameter to the quantization parameter to the quantization parameter calculation means;

a macro-block skip control means for determining whether or not a macro-block is skipped upon receipt of the size of the bit stream from the encoding means and upon receipt of the maximum allowable number of bits from the target bit calculation means for thereby outputting a macro-block skip signal; and a bit stream manipulation means for combining the macro-block skip signal from the macro-block skip control means and the bit stream from the encoding means.

7. The apparatus as recited in claim 6, wherein the quantization parameter calculation means includes:

a threshold calculation means for calculating a threshold according to the target number of encoding bits, maximum allowable number of bits, and minimum allowable number of bits from the target bit calculation means;

a quantization parameter calculation means for calculating a quantization parameter (QP) according to the target number of encoding bits (target_bit), maximum allowable number of bits (max _bit), and minimum allowable number of bits (min_bit) from the target bit calculation means and a model parameter from the model update means;

a latch means for storing the number of accumulated bits;

an adding means for adding the size of the bit stream of the previous macro-block and the number of accumulated bits from the latch means for thereby outputting the sum thereof to the latch means; and a comparing means for comparing the number of accumulated bits from the adding means with the threshold from the threshold calculation means for thereby determining whether or not a macro-block is encoded.

8. The apparatus as recited in claim 7, wherein the threshold calculation means calculates a threshold by using all or parts of the target number of encoding bits, maximum allowable number of bits, and minimum allowable number of bits from the target bit calculation means.

9. The apparatus as recited in claim 7, wherein the quantization parameter calculation means obtains a quantization parameter by using all or parts of the target number of encoding bits, maximum allowable number of bits, and minimum allowable number f bits from the target bit calculation means.

10. The apparatus as recited in claim 7, wherein the number of accumulated bits stored in the latch means is set to "0" so that the number of accumulated bits of the next frame can be stored after encoding of one frame is completed.

11. The apparatus as recited in claim 7, wherein the comparing means compares the number of accumulated bits from the adding means, and then outputs a signal indicating whether or not picture information is encoded, so as to encode the picture information, in a case that the number of accumulated bits is less than the threshold, or outputs a signal indicating whether or not picture information is encoded, so as to avoid overflow of the buffer, in a case that the number of accumulated bits is larger than the threshold.

12. The apparatus as recited in claim 6, wherein the encoding means comprises:

a quantization means for quantizing a transform coefficient according to the quantization parameter from the quantization parameter calculation means; and a switching means for selecting either one of a meaningless data set to "0" and the quantized transform coefficient of the quantization means according to the signal indicating whether or not picture information is encoded from the quantization parameter calculation means for outputting the same.

13. The apparatus as recited in claim 6, wherein the macro-block skip control means comprises:

a latch means for storing the number of accumulated bits;

an adding means for adding the size of the bit stream of the current macro-block from the encoding means and the number of accumulated bits from the latch means for thereby outputting the sum thereof to the latch means; and a comparing means for comparing the number of accumulated bits from the adding means with the maximum allowable number of bits from the target bit calculation means for thereby determining whether or not the current macro-block is transmitted.

14. The apparatus as recited in claim 13, wherein the comparing means outputs a macro-block skip signal so that the bit stream for the current macro-block is directly transmitted, in a case that the number of accumulated bits from the adding means is less than the maximum allowable number of bits, or outputs a macro-block skip signal so that the bit stream for the current macro-block is not outputted, in a case that the number of accumulated bits from the adding means is larger than the maximum allowable number of bits.

15. The apparatus as recited in claim 13, wherein the number of accumulated bits stored in the latch means is set to "0" so that the number of accumulated bits of the next frame can be stored after encoding of one frame is completed.

16. The apparatus as recited in claim 6, wherein the bit stream manipulation means selects and outputs a macro-block skip bit stream when a macro-block skip signal for making the current macro-block not transmitted is inputted from the macro-block skip means, or selects and outputs a bit stream when a macro-block skip signal for transmitting the current macro-block is inputted therefrom, upon receipt of the encoded bit stream from the encoding means, or upon receipt of the macro-block skip bit stream indicating the current macro-block is not encoded.

17. A rate control method for real-time video communication, comprising the steps of:

a) setting an initial value required for rate control according to the transmission speed of a transmission channel and the frame rate of an image to be encoded;

b) obtaining the target number of encoding bits, maximum allowable number of bits, and minimum allowable number of bits in consideration of the current state of a buffer and the transmission speed of the transmission channel;

c) executing rate control and encoding using the target number of encoding bits, maximum allowable number of bits, and minimum allowable number of bits;

d) comparing the size of an encoded bit stream with the target number of encoding bits for thereby outputting meaningless stuffing bits;

e) storing a combination of the encoded bit stream and the stuffing bits and making video information transmitted; and f) determining whether or not the next input frame is encoded according to a frame skip signal generated according to the current state of the buffer, wherein, in the step c), it is controlled such that the length of a bit stream does not exceed the maximum allowable number of bits by not encoding picture information, in a case that the total number of encoding bits of the stream accumulated until the currently encoded macro-block is reached exceeds a predetermined allowable limit calculated from the maximum allowable number of bits, target number of encoding bits, or minimum allowable number of bits.

18. The method as recited in claim 17, wherein the minimum allowable number of bits is obtained by Min__bit=max $\{B_{fd}+B_a-B_d-B_{fe}, 0\}$, an the maximum allowable number of bits is obtained by Max__bit=min $\{B_{fd}, B_e-B_{fe}\}$, wherein $B_{fd}$ denotes the stuffed state of the decoder buffer, $B_a$ denotes the number of bits of the bit stream transmitted from the buffer during encoding of one frame, $B_d$ denotes the size of the decoder buffer, $B_e$ denotes the size of the encoder buffer, $B_{fe}$ denotes the stuffed state of the encoder buffer, min { }denotes a function for outputting the minimum value of elements, and max { }denotes a function for outputting the maximum value of elements.

19. The method as recited in claim 17, wherein, in the step d), a meaningless stuffing bit stream is outputted to the buffer module as much as the number of bits more than the gap between the size of the bit stream and the minimum allowable number of bits, in a case that the size of the bit stream is smaller than the minimum allowable number of bits by comparing the minimum allowable number of bits from the target bit calculation means with the size of the bit stream from the macro-block rate control and encoder means.

20. The method as recited in claim 17, wherein, in the step c), it is ensured that the length of a bit stream does not exceed the maximum allowable number of bits by discarding the bit stream for the currently encoded macro-block, in a case that the total number of bits of the bit stream accumulated until the currently encoded macro-block is reached.

21. The method as recited in claim 20, wherein, in the step c), a bit stream representing that the current macro-block is not encoded is added, in a case that the bit stream for the current macro-block is discarded.

22. The method as recited in claim 17, wherein the step c) includes:

c1) determining a quantization parameter and whether or not the corresponding macro-block is encoded, according to the target number of encoding bits, maximum allowable number of bits, and minimum allowable number of bits, the size of the bit stream of the previous macro-block, and a model parameter;

c2) determining a quantization width of a transform efficient according to the quantization parameter, and executing encoding according to the signal indicating whether or not encoding is executed;

c3) generating a model parameter by updating a model according to the size of the encoded bit stream and the quantization parameter;

c4) determining whether or not a macro-block is skip signal by comparing the size of the encoded bit stream with the maximum allowable number of bits; and c5) combining the macro-block skip signal and the encoded bit stream.

23. The method as recited in claim 22, wherein the step g) includes:

g1) obtaining a threshold according to the target number of encoding bits, maximum allowable number of bits, and minimum allowable of bits;

g2) obtaining a quantization parameter according to the target number of encoding bits, maximum allowable number of bits, and minimum allowable number of bits and the model parameter;

g3) obtaining a new number of accumulated bits by adding the size of the encoded bit stream for the previous macro-block and the encoded bit stream for the previous macro-block and the number of accumulated bits; and g4) determining whether or not a macro-block is encoded by comparing the newly obtained number of accumulated bits with the obtained threshold.

24. The method as recited in claim 23, wherein in the step g3), a signal indicating whether or not picture information is encoded is outputted so as to encode the picture information, in a case that the number of accumulated bits is less than the threshold, or a signal indicating whether or not picture information is encoded is outputted so as to avoid overflow of the buffer, in a case that the number of accumulated bits is larger than the threshold, by comparing the obtained number of accumulated bits with the threshold.

25. The method as recited in claim 22, wherein the step c4) includes;

c41) obtaining a new number of accumulated bits by adding the size of the encoded bit stream for the current macro-block and the number of bits accumulated until the previous macro-block is reached; and c42) determining whether or not the current macro-block is transmitted by comparing the obtained number of accumulated bits with the maximum allowable number of bits.

26. The method as recited in claim 25, wherein, in the step g2), a macro-block skip signal is outputted so that the bit stream for the current macro-block is directly transmitted, in a case that the number of accumulated bits is less than the maximum allowable number of bits, or a macro-block skip signal is outputted so that the bit stream for the current macro-block is not outputted, in a case that the number of accumulated bits is larger than the maximum allowable number of bits.

27. The method as recited in claim 22, wherein, in the step c5), a macro-block skip bit stream is selected and outputted when a macro-block skip signal for making the current macro-block not transmitted is inputted, or a bit stream is selected and outputted when a macro-block skip signal for transmitting the current macro-block is inputted, by combining the encoded bit stream and the macro-block skip bit stream indicating that the current macro-block is not encoded.

28. In a rate control apparatus having a process, for rate control for real-time video communication, a recording medium, which can be read by a computer having a program for realizing:

a first function of setting an initial value required for rate control according to the transmission speed of a transmission channel and the frame rate of an image to be encoded;

a second function of obtaining the target number of encoding bits, maximum allowable number of bits, and minimum allowable number of bits in consideration of the current state of a buffer and the transmission speed of the transmission channel;

a third function of executing rate control and encoding using the target number of encoding bits, maximum allowable number of bits, and minimum allowable number of bits;

a fourth function of comparing the size of an encoded bit stream with the target number of encoding bits for thereby outputting meaningless stuffing bits;

a fifth function of storing a combination of the encoded bit stream and the stuffing bits and making video information transmitted; and a sixth function of determining whether or not the next input frame is encoded according to a frame skip signal generated according to the current state of the buffer, wherein the third function further comprises:

a seventh function of determining a quantization parameter and whether or not the corresponding macro-block is encoded, according to the target number of encoding bits, maximum allowable number of bits, and minimum allowable number of bits, the size of the bit stream of the previous macro-block, and a model parameter.

an eighth function of determining a quantization width of a transform efficient according to the quantization parameter, and executing encoding according to the signal indicating whether or not encoding is executed;

a ninth function of generating a model parameter by updating a model according to the size of the encoded bit stream and the quantization parameter;

a tenth function of determining whether or not a macro-block is skipped for thereby generating a macro-block skip signal by comparing the size of the encoded bit stream with the maximum allowable number of bits; and an eleventh function of combining the macro-block skip signal and the encoded bit stream.

29. The recording medium as recited in claim 28, wherein the seventh step comprises:

a twelfth function of obtaining a threshold according to the target number of bits; maximum allowable number of bits, and minimum allowable number of bits; a thirteenth function of obtaining a quantization parameter according to the target number of encoding bits, maximum allowable number of bits, and minimum allowable number of bits and the model parameter;

a fourteenth function of obtaining a new number of accumulated bits by adding the size of the encoded bit stream for the previous macro-block and the number of accumulated bits; and a fifteenth function of determining whether or not a macro-bock is encoded by comparing the newly obtained number of accumulated bits with the obtained threshold.

* * * * *